US008115610B2

(12) United States Patent
Lionetti et al.

(10) Patent No.: US 8,115,610 B2
(45) Date of Patent: Feb. 14, 2012

(54) RFID ENABLED TIRE CONTROL SYSTEM AND METHOD

(75) Inventors: Robert Edward Lionetti, Bereldange (LU); Christian Raabe, Solingen (DE); Anthony Olave Donald Duffy, Solihull (GB)

(73) Assignee: The Goodyear Tire & Rubber Company, Akron, OH (US)

( * ) Notice: Subject to any disclaimer, the term of this patent is extended or adjusted under 35 U.S.C. 154(b) by 98 days.

(21) Appl. No.: 12/341,243

(22) Filed: Dec. 22, 2008

(65) Prior Publication Data

US 2010/0156641 A1    Jun. 24, 2010

(51) Int. Cl.
*B60R 25/10* (2006.01)
*B60C 23/00* (2006.01)
*G08B 13/14* (2006.01)

(52) U.S. Cl. ............... 340/426.33; 340/572.1; 340/442; 340/447; 340/933; 73/146.4; 73/146.5; 235/384; 705/13; 701/29

(58) Field of Classification Search ............. 340/426.33
See application file for complete search history.

(56) References Cited

U.S. PATENT DOCUMENTS

| | | | |
|---|---|---|---|
| 6,822,582 B2 * | 11/2004 | Voeller et al. | 340/933 |
| 7,233,260 B2 * | 6/2007 | Tang et al. | 340/928 |
| 7,372,364 B2 * | 5/2008 | Mercer et al. | 340/572.1 |
| 2004/0145472 A1 * | 7/2004 | Schmidtberg et al. | 340/539.27 |
| 2006/0087427 A1 * | 4/2006 | Le | 340/539.13 |
| 2007/0222568 A1 * | 9/2007 | Morar et al. | 340/447 |

FOREIGN PATENT DOCUMENTS

WO   2004/068769   8/2004

OTHER PUBLICATIONS

European Search Report completed Mar. 16, 2010.

* cited by examiner

*Primary Examiner* — Donnie Crosland
(74) *Attorney, Agent, or Firm* — Richard B. O'Planick

(57) ABSTRACT

A tire control system for a vehicle is provided includes an RFID tag mounted to the tire and having a unique tire serial number stored within tag memory accessible to an external reader; a pass-through portal operatively entered and exited by the vehicle; one or more tire-directed antenna positioned within the portal for operatively receiving one or more one data transmissions of the unique tire serial number from the tire-based RFID tag; and one or more tire-directed RFID reader coupled to the tire-directed antennas for operably reading and storing within a tire-based database the unique tire serial number data. A vehicle-based RFID tag is mounted to the vehicle having a unique vehicle serial number stored within tag memory and transmitted to an external reader as the vehicle moves through the portal. A data processing computer is coupled to receive the portal-read unique tire serial number and vehicle serial number and conducts of the portal-read unique tire serial number data and the unique vehicle serial number data against prestored reference tire serial number data and prestored reference vehicle serial number data, respectively.

17 Claims, 12 Drawing Sheets

RFID ENABLED TIRE CONTROL SYSTEM AND METHOD

FIELD OF THE INVENTION

The invention relates generally to a control system for tracking tires and, more specifically, to a tire control system for automatically identifying tires associated with a vehicle.

BACKGROUND OF THE INVENTION

Tire identification and control is desirable in myriad commercial applications such as in vehicle fleet maintenance, motor sports, access control, government compliance, warehousing, tire and vehicle development and testing. In such applications, satisfying the need for identifying the tires mounted to a vehicle in an efficient, predictable, timely, and accurate manner is important. Because of the time involved, tire identification and management is known to be conducted manually by stopping the vehicle and conducting a tire inspection. Alternatively, in order to expedite the identification process, only certain tires are inspected and identified by a sampling approach. Stopping a vehicle and manually identifying all or some of its tires is a costly and time intensive procedure. Therefore, there is a need to achieve a system of tire identification that can automatically identify all vehicle mounted tires in a more timely and cost effective manner than currently available manual techniques.

SUMMARY OF THE INVENTION

In one aspect of the invention a tire control system for a vehicle is provided including one or more tire-based RFID tags mounted to the tire and having a unique tire serial number stored within tag memory accessible to an external reader; a pass-through portal operatively entered and exited by the vehicle; one or more tire-directed antenna positioned within the portal for operatively receiving one or more one data transmissions of the unique tire serial number from the tire-based RFID tag; and one or more tire-directed RFID readers coupled to the tire-directed antennas for operably reading and storing within a tire-based database the unique tire serial number data.

In another aspect of the invention, the one or more tire-directed antennas operatively receive data transmission(s)s of the unique tire serial number from the tire-based RFID tag as the vehicle moves through the portal. One or more vehicle-based RFID tags may be mounted to the vehicle in an additional aspect, each having a unique vehicle serial number stored within tag memory accessible to an external reader. One or more vehicle-directed antennas are positioned within the portal for operatively receiving data transmission(s) of the unique vehicle serial number from the vehicle-based RFID tag(s). One or more vehicle-directed RFID readers are coupled to the vehicle-directed antenna for operably reading and storing within a vehicle-based database the unique vehicle serial number data.

Yet a further aspect of the invention is to provide data processing means coupled to the tire-directed reader(s) and the vehicle-directed reader(s) for operatively receiving the stored unique tire serial number and vehicle serial number. The data processing means conducts comparisons of the stored unique tire serial number data and the stored unique vehicle serial number data against prestored reference tire serial number data and prestored reference vehicle serial number data, respectively.

The invention, in another aspect, is directed to a method of tire control for a vehicle and includes positioning the vehicle within a pass-through portal configured for vehicle entry and exit, the tire having at one or more tire-based RFID tag(s) mounted to the tire, the tire-based RFID tag(s) having a unique tire serial number stored within tag memory accessible to an external reader; and transmitting in a read sequence to one or more tire-directed reader(s) by one or more data transmissions the unique tire serial number from the tire-based RFID tag(s).

The method in a further aspect includes transmitting during the read sequence one or more data transmissions of a unique vehicle serial number from one or more vehicle-based RFID tags having the unique vehicle serial number stored therein. The method may further include comparing the unique tire serial number and the unique vehicle serial number against a prestored reference tire serial number and a reference vehicle serial numbers, respectively

BRIEF DESCRIPTION OF THE DRAWINGS

The invention will be described by way of example and with reference to the accompanying drawings in which.

DEFINITIONS

Figure 1:
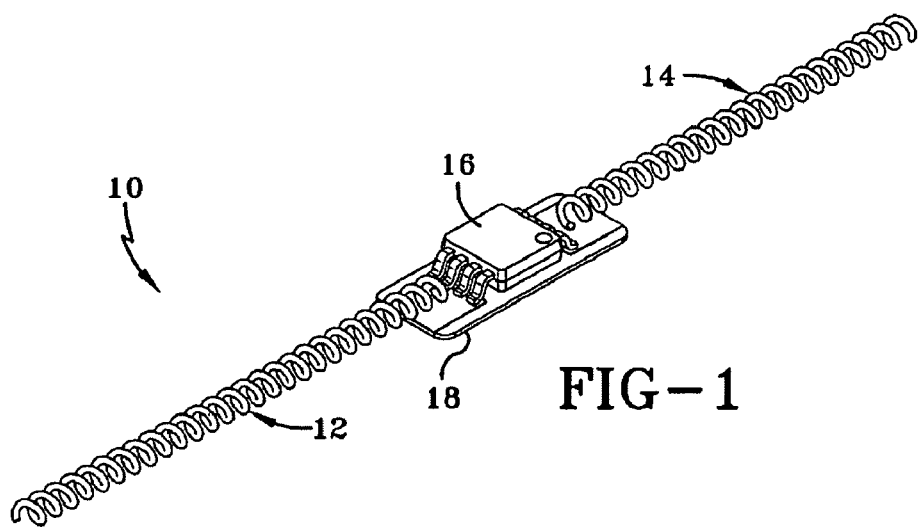
FIG. 1 is a perspective view of an RFID tag embodiment.

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

DETAILED DESCRIPTION OF THE INVENTION

Figure 2:
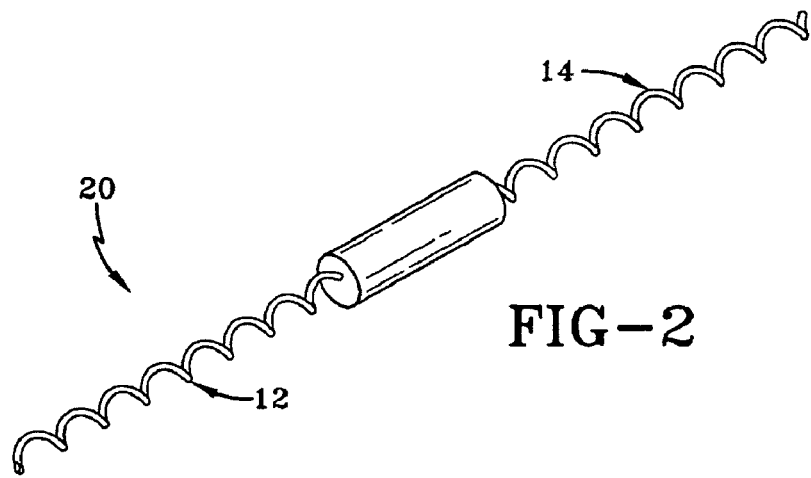
FIG. 2 is a perspective view of a tubular alternative RFID tag embodiment.
Figure 3:
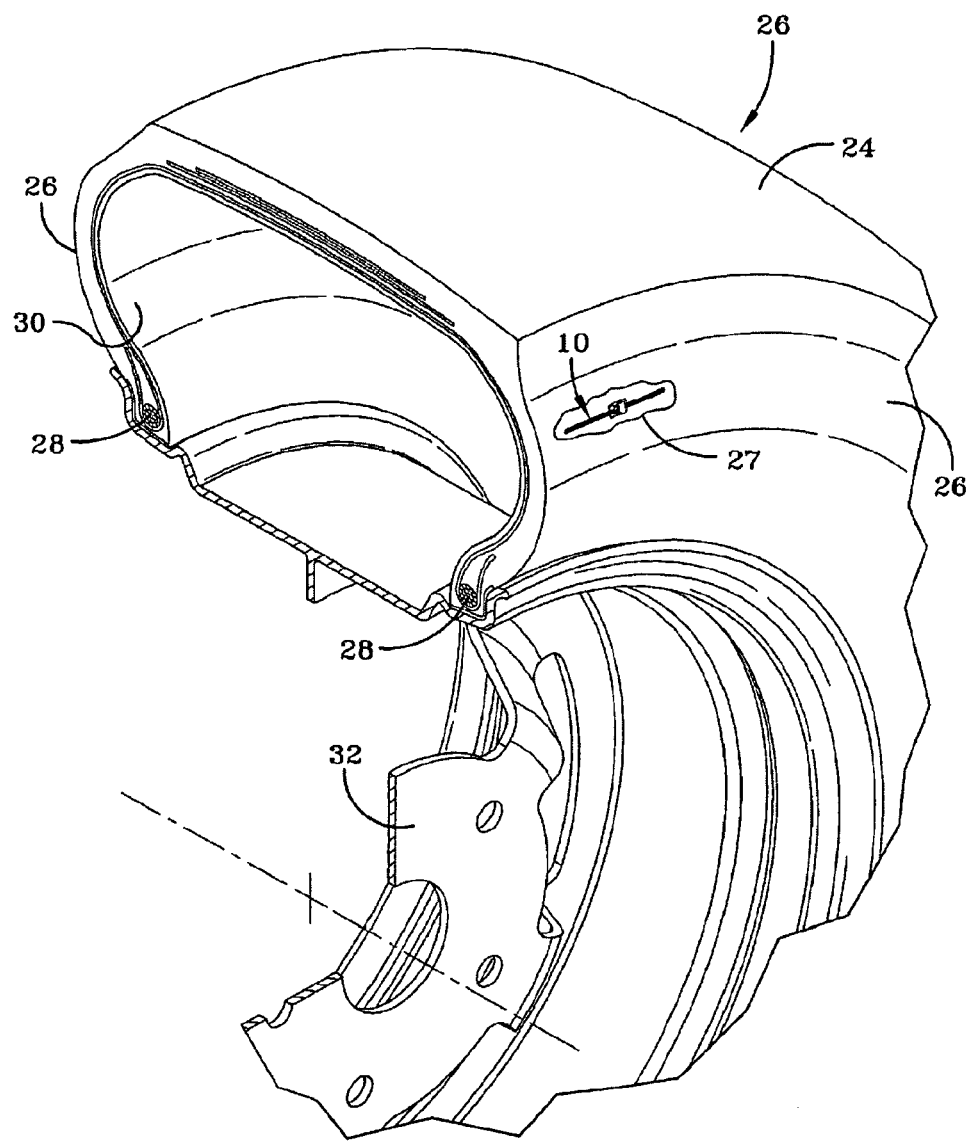
FIG. 3 is a perspective view in partial section of a portion of a wheel mounted tire having an RFID tag mounted thereto.

Referring to FIGS. 1, 2, and 3, an RFID tag 10 is shown to include a pair of coiled antenna segments 12, 14 coupled to a RFID electronics package 16 and mounted on a substrate 18. An alternatively configured tag is shown in FIG. 2 having the electronics package and antenna coupling interface embedded within a protective tubular sleeve 20. The tag 10 may be embedded into a tire 22 during manufacture or attached in a post manufacture procedure as shown in FIG. 3. The tire 22 is shown in a generic configuration having a tread region 24, a pair of sidewalls 26 extending from a pair of beads 28, and an innerliner 30. The tag 10 may be attached at a suitable location of the tire such as the sidewall or innerliner by means of adhesive 27. Generally, the tire 22 may be of any construction for any application and utilize the teachings of the invention.

Functionally, the tag 10 includes data memory and a transmission circuit for transmitting data from memory to an external reader. The tag may be powered internally or, more commonly, receive RF signals from an external source to power the tag. The tag 10 is of a type commercially available. A unique serial number for the tire may be assigned by the tire manufacturer, tire purchaser, or, as in racing tires, by a race governing entity. The serial number serves as a unique identification number associated with the tire in tag memory either during or after tire manufacture. The unique serial number provides a means for tracking the tire throughout its useful life. The unique tire serial number may be in the format of an electronic product code (EPC) number or another formatted uniquely assigned number. The number, being unique to the tire, follows the tire so long as the tag 10 remains attached and the tire remains in service.

Figure 4:
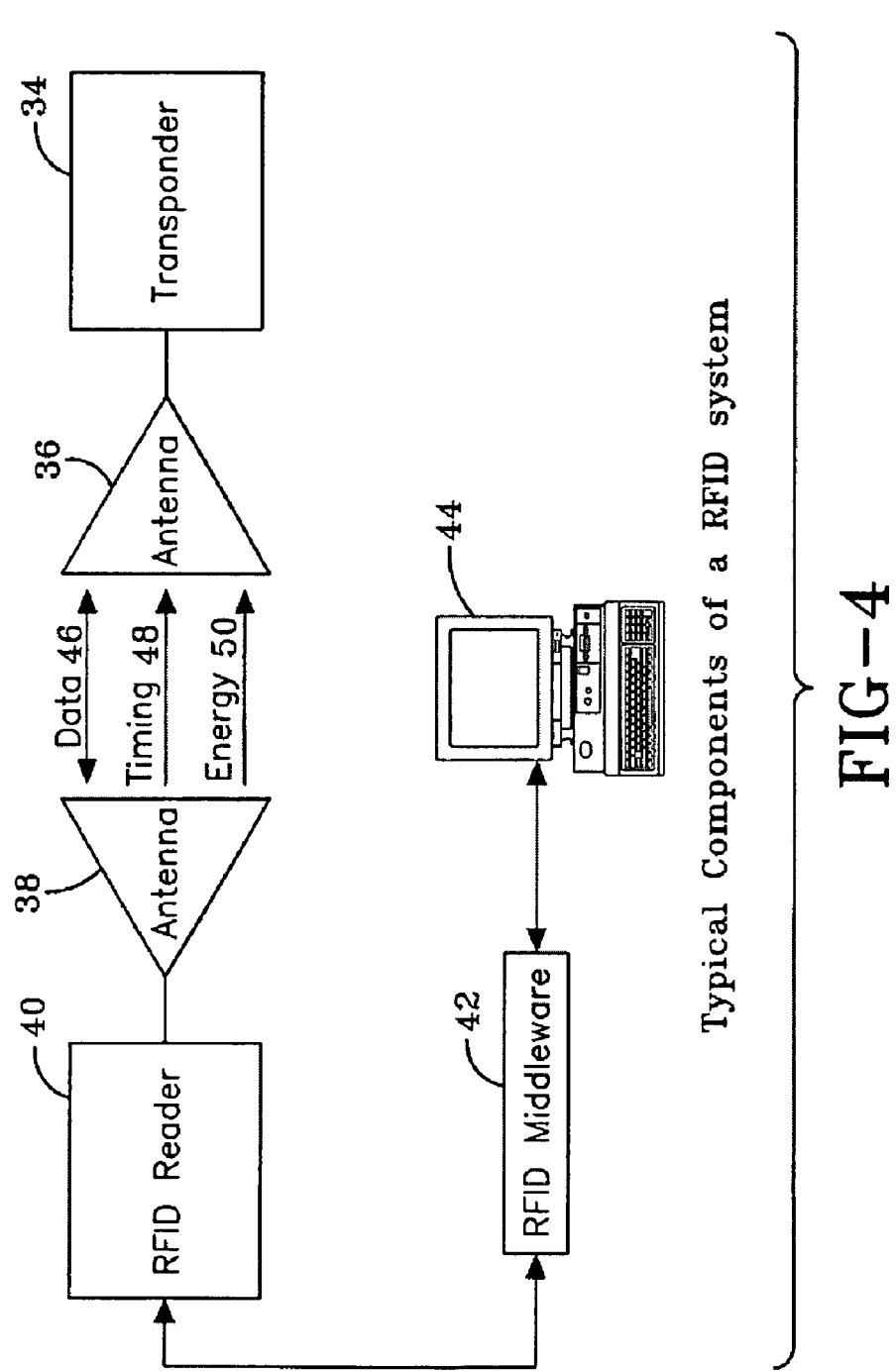
FIG. 4 is a schematic view of an RFID system.

A typical RFID system is shown schematically in FIG. 4. A transponder 34 such as an RFID tag 10 transmits data 46 via an antenna 36 to a receiving antenna 38 coupled to an RFID reader 40. The transponder 34 in turn may receive from an external source timing data and commands 48 and/or energy 50 by which to power the functions and activities of the transponder 34. The transponder 34 may transmit other types of data such as tire air pressure and temperature if desired. The RFID reader 40 relays data 46 through RFID middleware 42 to a data processor 44 such as a computer where the data is collected, stored, processed, and displayed. The reader 40 controls its own operation, and has a user configured application(s) running on it to control the system, readers, antennas, light gate. The computer is used to specifically initiate the reader program and host the data collection program.

Figure 11:
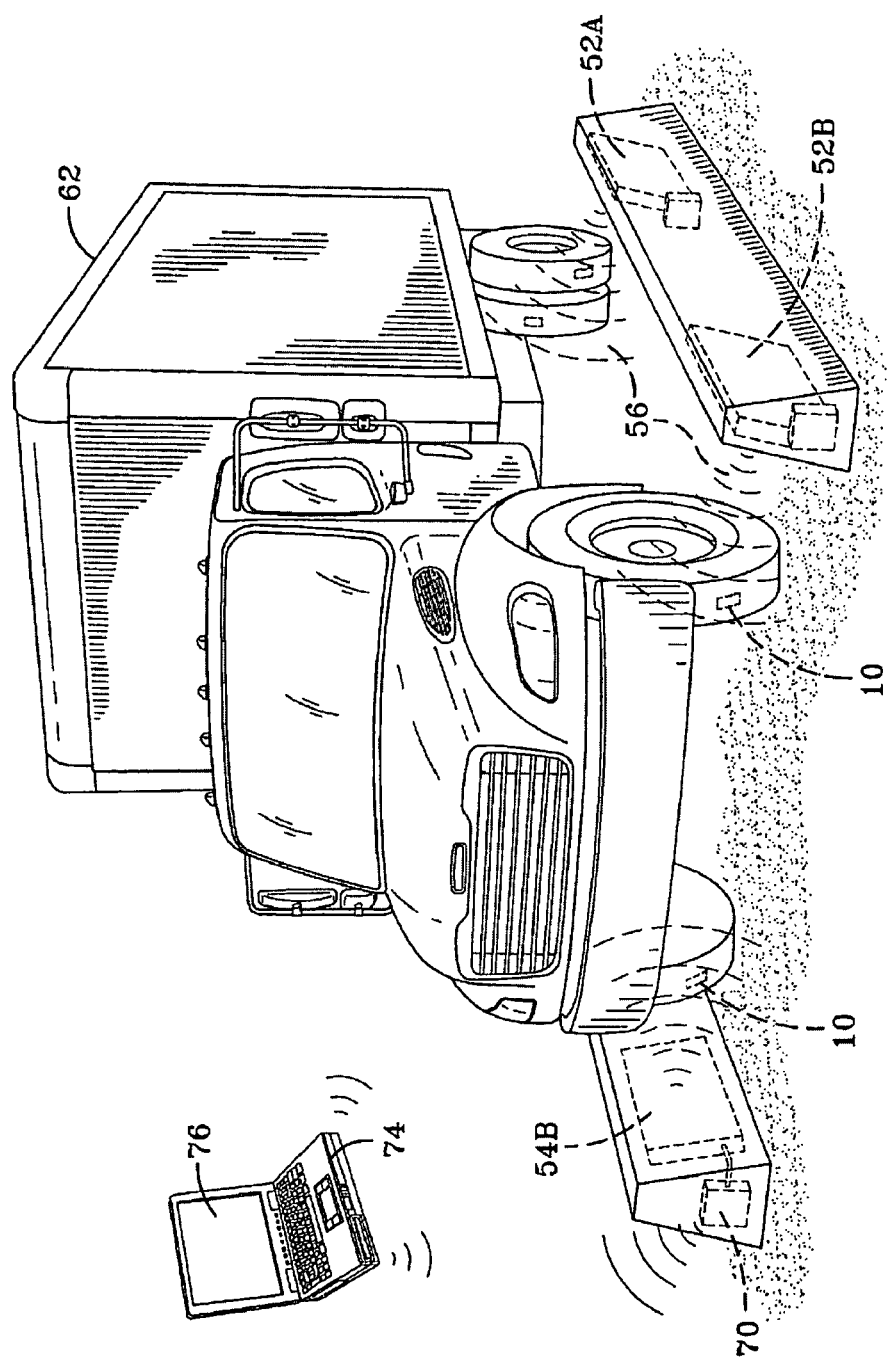
FIG. 11 is a perspective view of a commercial truck application having a reader portal incorporated therein in a wireless configuration.

The tire 22 and tag 10 may be used in sundry applications such as commercial trucking fleets; passenger car service; or motor sports. FIG. 11 shows a commercial truck application utilizing a wireless system by way of example. The invention may also be applied to motorcycle applications wherein a motorcycle and its tires may be equipped with an identification tag(s). For the purpose of this specification, in general, a system configuration of the type useful in motor sports will be used. However, it will be understood that the invention has utility in other applications where tracking a tire and monitoring its identity and association with a vehicle throughout the useful life of the tire is desired.

Figure 5:
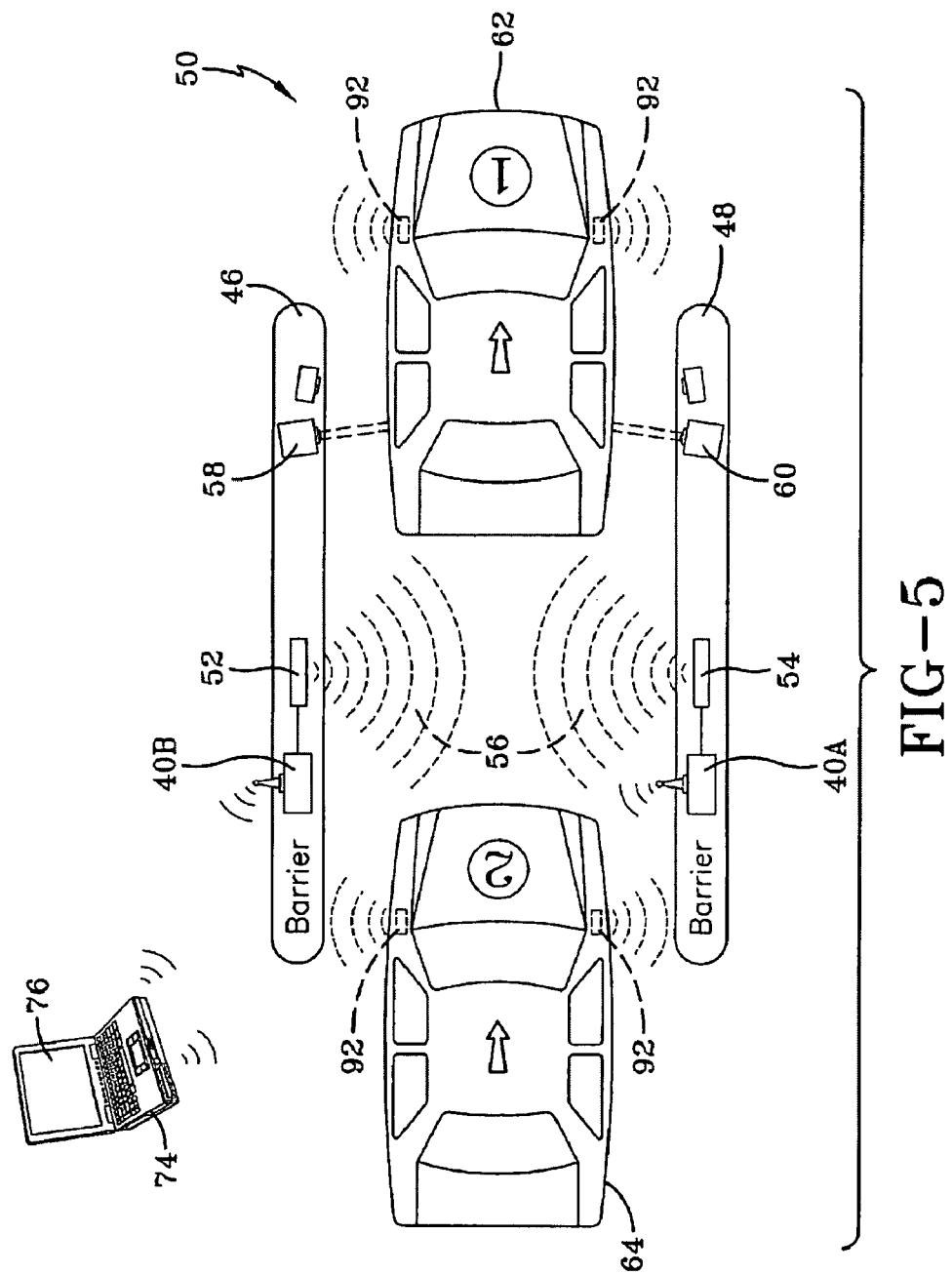
FIG. 5 is plan view of the track reader system shown in FIGS. 6, 7, and 8 having an above-ground antenna location.
Figure 5A:
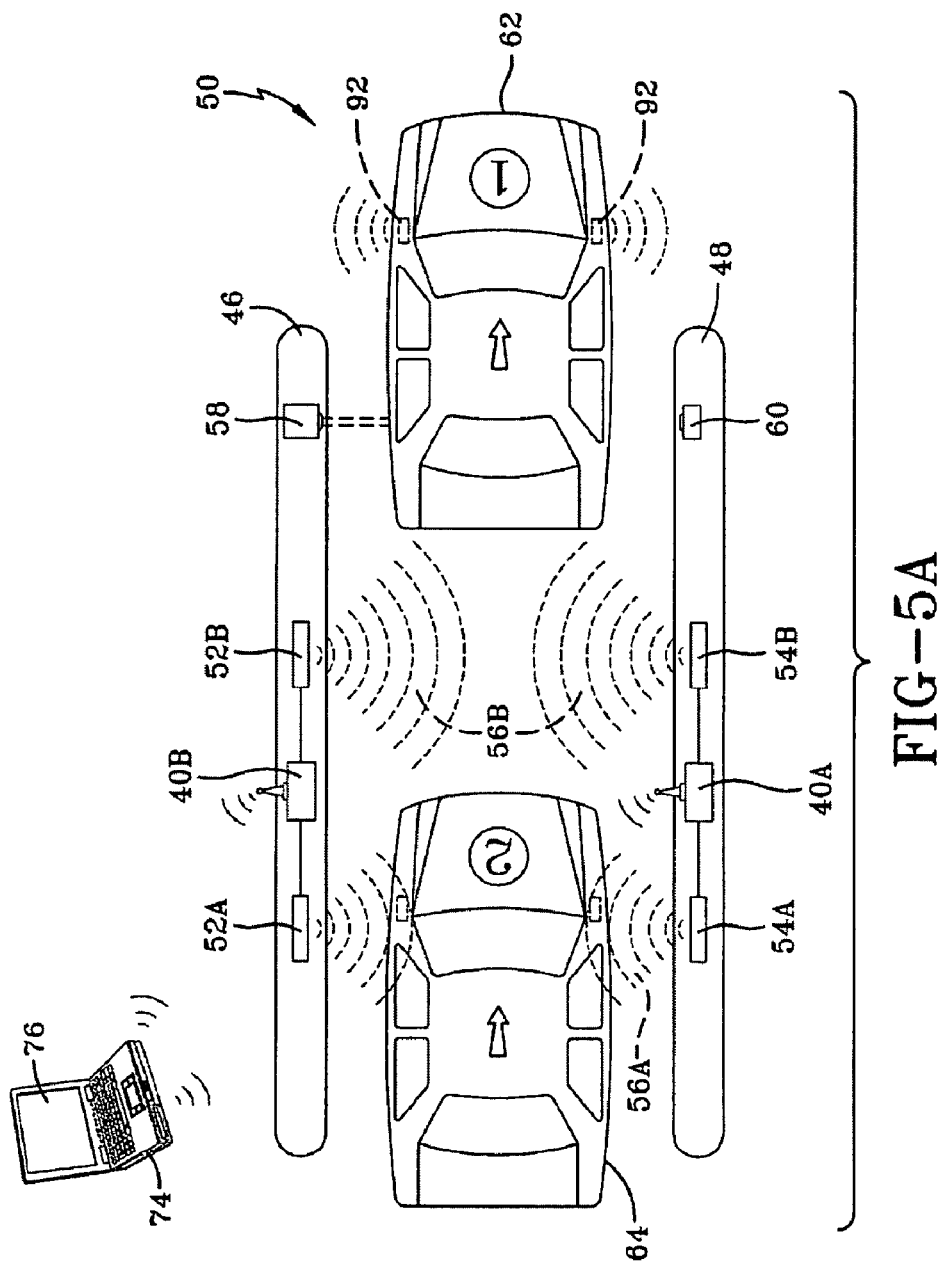
FIG. 5A is a plan view of a multiple antenna RFID system.
Figure 5B:
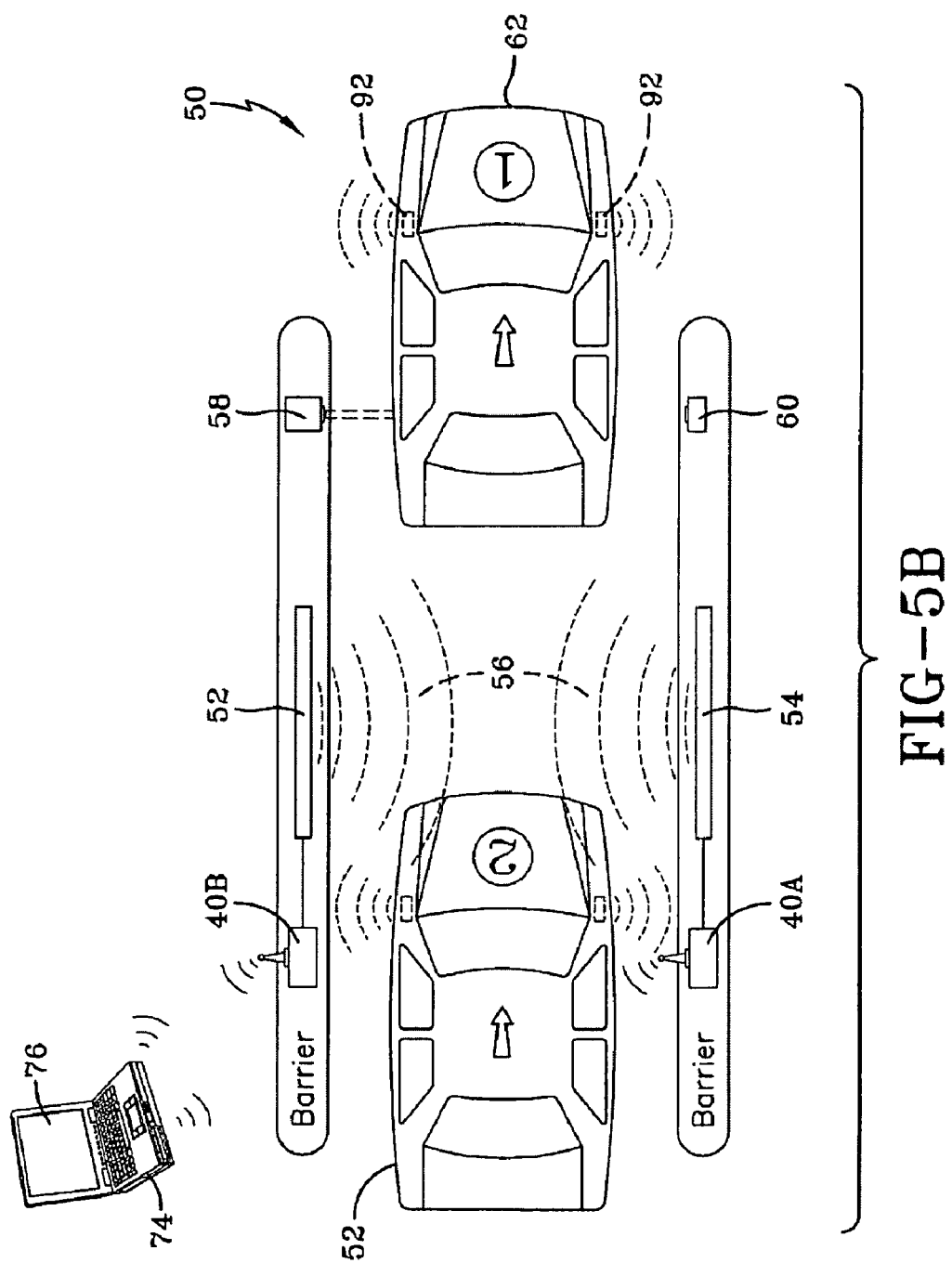
FIG. 5B is a plan view of a multiple antenna wide-field wireless system.

A typical RFID tire configured system is shown in FIGS. 5, 5A, and 5B in which a race track pit lane is equipped with hardware implementation of the subject invention. FIG. 5 shows a pair of antennas 52, 54 at read positions on opposite respective sides of a pit exit lane. FIG. 5A shows two pairs of antennas, 52A, 52B and 54A, 54B spaced apart within a read portal, each pair producing a read field 56A, 56B, respectively. FIG. 5B shows a wireless configuration having a pair of elongated antennas 52, 54 that produce a read field 56 of wider configuration than the configurations of FIGS. 5 and 5A, thus illustrating the effect of antenna configuration on read field configuration.

Tire distribution to teams in most Motorsports events is controlled by racing entities such as British Touring Car Championship or NASCAR. There may be a specific tire for a race circuit and/or a specified quantity of tires that can be used during an event. The racing officials are charged with enforcing the rules. To accomplish tire control, each tire is assigned a serial number and the tires are tracked by a manual or computer database. Collecting tire information is currently done by scanning the tires manually by reading bar codes or scanning RFID tags using hand held readers. Although checks are made prior to the race and some audits may be done during the race, these methods can check only up to 10-20% of tires actually running on the circuit. At some events, vehicles are stopped before leaving the pit lane to check tires. However, were each car stopped to check the tires, a prohibitively long queue to the track and valuable lost track time would be lost to the detriment of fan enjoyment.

Accordingly, the system shown schematically in various embodiments of FIGS. 5-10 permits automatic identification of tires and full real-time visibility over tires as the race cars leave via a pit lane. No stopping of the vehicles for manual checks is required. Thus, no extra time is required and more of the allotted circuit time can be used by the teams for testing and qualification laps. The real-time data collection can also provide additional information to fans and increase fan interest and race appeal.

FIG. 5, 5A, and 5B show a portal 50 defined by spaced apart elongate barriers 46, 48. The portal 50 may be positioned along a lane between a pit area and a track. So located, race cars must pass between the barriers 46, 48 to reach the track. Positioned within the barriers are antennas 52, 54 at a height that provides optimal coupling with the tire tags of the car as the car passes through the portal. The antennas 52, 54 establish a field 56 that covers the portal area that race cars 62, 64 must pass through. Also positioned within one of the barriers, either at the entry or the exit ports or both of the portal 50, is a light gate 58 that couples with a reflector 60 mounted to the opposite barrier. The light gate directs a beam to reflector and receives the beam back until the beam is broken by a car 62 leaving or entering the portal 50. Upon detecting the presence of car 62, for example as shown, as it exits the portal 50, the light gate 58 will communicate with antenna/reader apparatus that a new data collection sequence for the next car 64 may be initiated. The light gate and reflector 58, 60 are of a commercially available type. The best location of the system is at the exit of the portal although other locations may be used.

FIG. 5A shows in plan view a multiple antenna layout within a portal 50 in which multiple antennas 52A, 52B and 54A and 54 B are positioned at spaced apart intervals within the barriers 46, 48. As the vehicle 62 passes through the reader portal 50, one or more tire-based RFID tags 10 in each tire are read twice. One tire can be read once or multiple times if desired in order to better ensure an accurate reading of the tire tag(s). The vehicle 62 may also be equipped with one or more vehicle-based RFID tags (not shown) and a unique vehicle identification number programmed into the tag(s). The vehicle-based tags are mounted to the vehicle so that they may be read accessed by a field established within the portal 50. Separate antennas and readers for the vehicle-based tag(s) may be mounted to the barriers 46, 48 to read such tags or, more efficiently and preferably, the same antenna(s) and reader(s) may be used to read both vehicle and tire tags. As the vehicle passes through the reader portal 50, the vehicle based tag(s) are preferably, although not necessarily, read at the same time as the tire-based tags 10. Data including the unique vehicle serial number and the unique tire serial number can thereby be accessed and read simultaneously as the car passes through the portal 50.

The light gate 58 is integrated into the system to trigger the reader database to provide data parsed by each vehicle pass. The antennas 52A, 52B, 54A, 54B are placed on both sides of the portal 50 preferably at the height of the tires that read the passing RFID tags. The distance between the antennas 52A, 52B and 54A, 54B is about 4 meters, a distance sufficient for the car to pass yet not so great as to compromise read distance and system performance.

Figure 6:
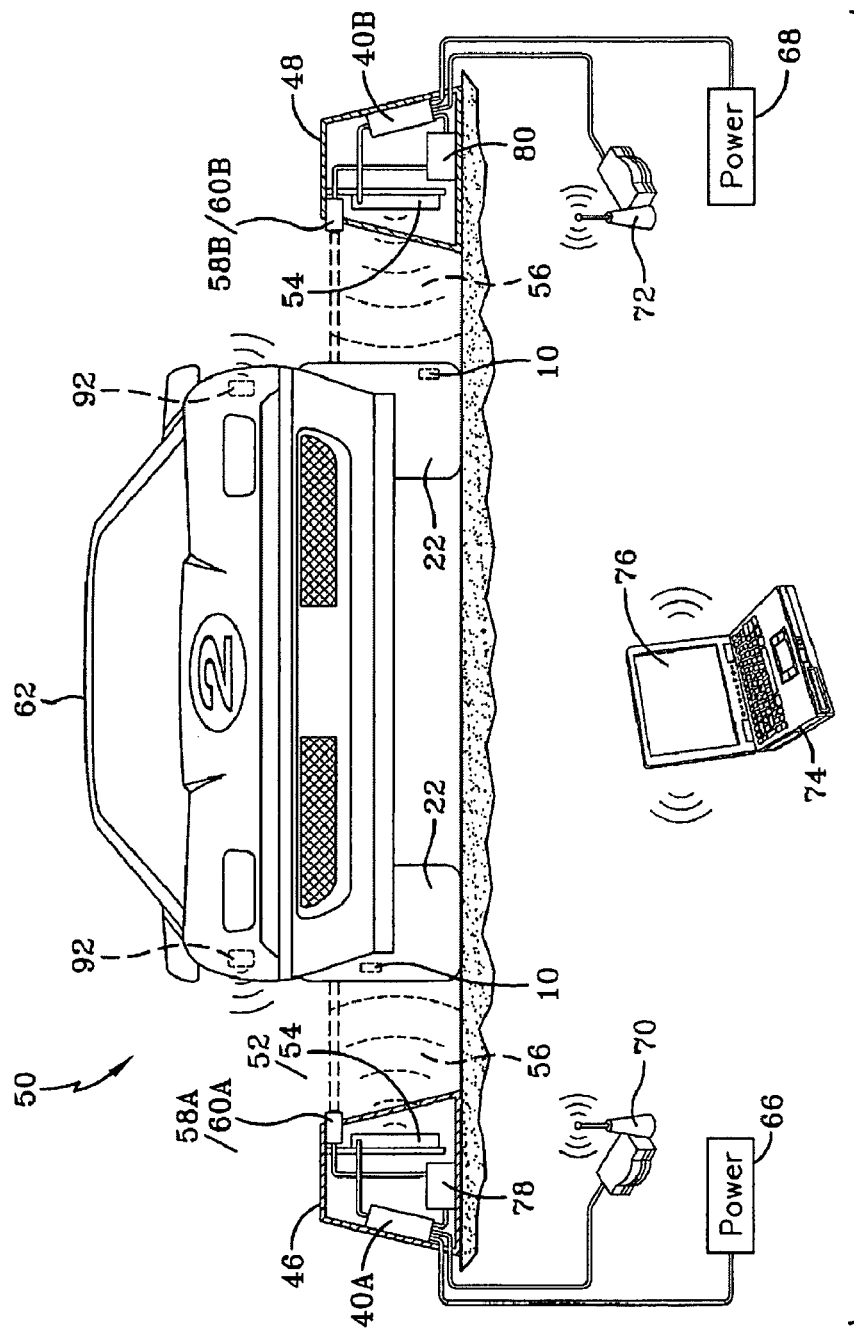
FIG. 6 is a front schematic view of a dual antenna, wireless, tire control system.

It is generally desirable to read the tire serial numbers before the vehicles exit the pit lane, although such a preference does not preclude placing the unit elsewhere such as at the entrance to the pit lane to facilitate networking with trace officials inspection locations. FIG. 6 illustrates a dual antenna wireless layout in which power sources 66, 68 are coupled to readers 40A, 40B, respectively. The antennae generate a field 56 that couples with the tags 10 mounted to tires 22 of the vehicle. The readers 40A, 40B are placed at the pit lane exit and the unique tire serial numbers and vehicle serial numbers are captured automatically as the vehicle passes through the reader portal 50. The system can capture the data as the vehicles move through the portal 50 and does not require vehicle stoppage.

As shown in FIG. 6, a reader and one antenna combination may be deployed on each side of the portal within the barriers 46, 48. A DI0 Box 78, 80 connects to the pair of light gate/reflectors 58A, 60A and 58B, 60B, respectively, and transmit data from the light gate to a respective reader 40A and 40B. The readers further receive transmission data from the tires and vehicle tags of the car 64 by means of dual antennae 54. Data collected by the readers 40A, 40B are transmitted to respective WLAN routers 70, 72 for wireless transmission to a data processing terminal or computer 74. Computer 74 is represented in laptop form and includes a visible display screen 76.

Reference serial numbers for a vehicle and/or its tires may be stored in a database within computer 74 and compared against the serial numbers read as the vehicle passes through portal 50. Discrepancies between reference and read serial numbers will indicate that the tires may not be the tires assigned to the car. An appropriate visible alert on screen 76 to a race official will then follow. The system in FIG. 6, as explained above, uses antenna and reader combination as well as WLAN router on each side of the portal 50 for wireless transmission of vehicle and tire serial number data to computer 74. Such a configuration eliminates the need to pass an antenna cable in an archway above the portal or in the ground between each side of the portal. This also can improve the performance of the system by only having one antenna if desired.

Figure 7:
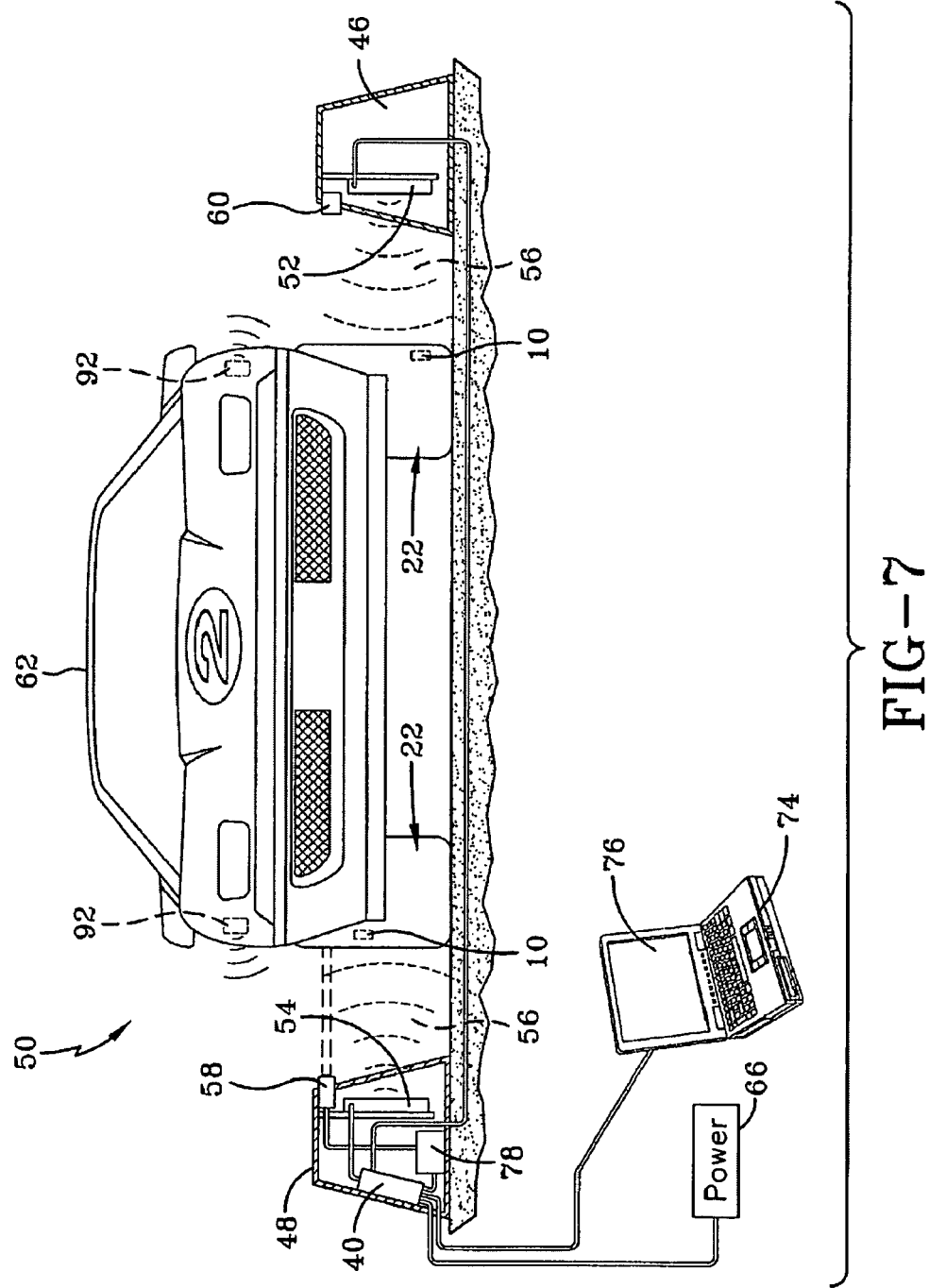
FIG. 7 is a front schematic view of a dual antenna system having an under ground connection layout.

FIG. 7 illustrates a dual antenna, underground, connection layout that hardwires antenna 52 to a reader 40 by means of an underground cable 82 extending underneath the portal 50 between barriers 46, 48. Antennae 52, 54 receive data from the vehicle and/or tire tag(s) as the vehicle 62 passes through the portal 50. The reader 40 is hardwired to the computer 74 that conducts the data collection, processing, and comparisons described above. The wireless system of FIG. 6 eliminates routing cable beneath a pit lane and, accordingly, renders the system more transportable and preferable.

Figure 8:
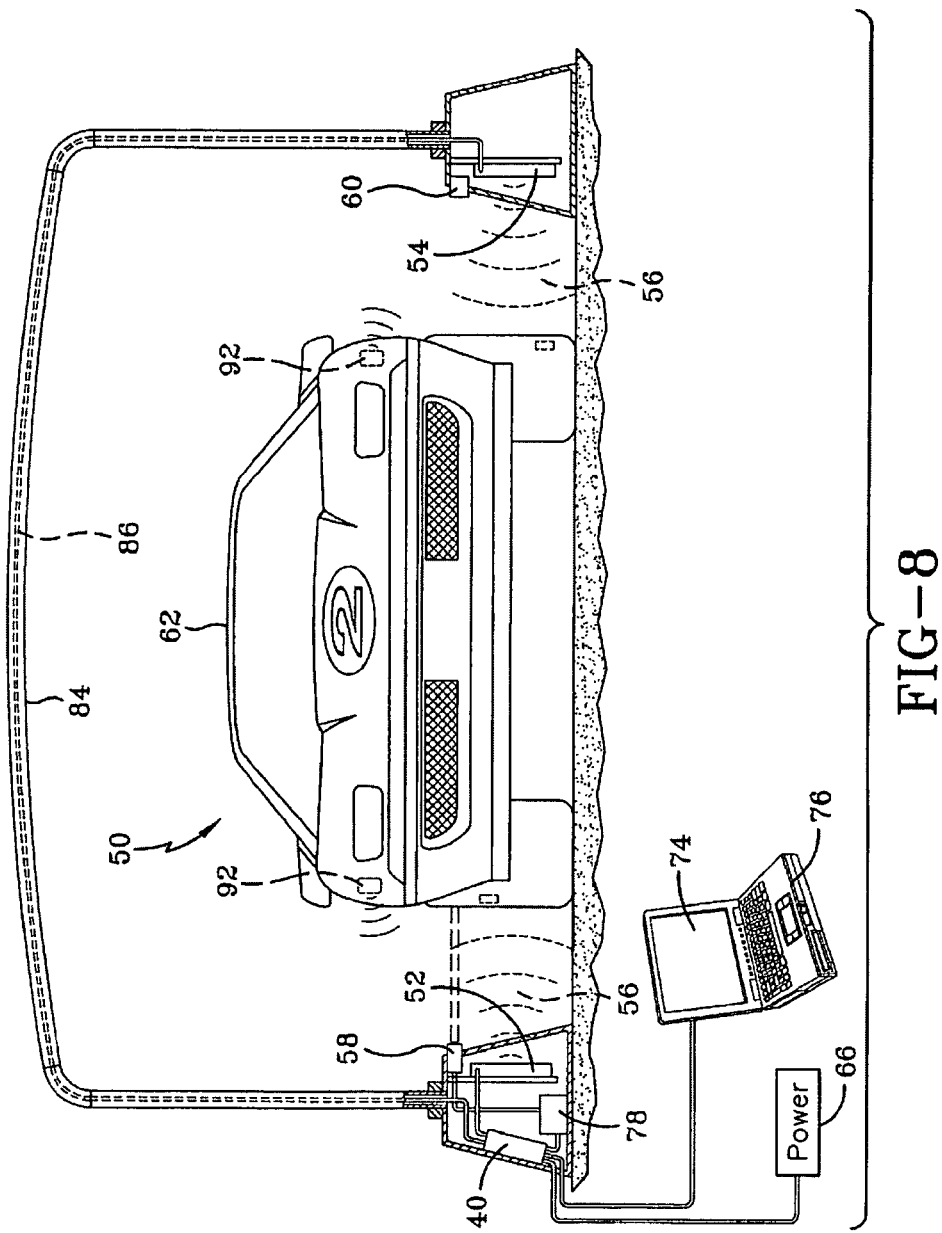
FIG. 8 is a front schematic view of a dual antenna system in an overhead layout.

FIG. 8 is yet another alternatively configured system of the invention and routes a cable 86 within an overhead conduit 84 over the portal 50. Antenna 54 is thereby wired into the reader 40 with antenna 52 and data collected from the vehicle 62 and/or tire tag(s) is transmitted by hardwire to computer 74. While somewhat easier to install than the in-ground system of FIG. 7, the FIG. 8 system configuration still requires installation of the bridging structure and is, accordingly, generally less preferred than the wireless system of FIG. 6.

Figure 9:
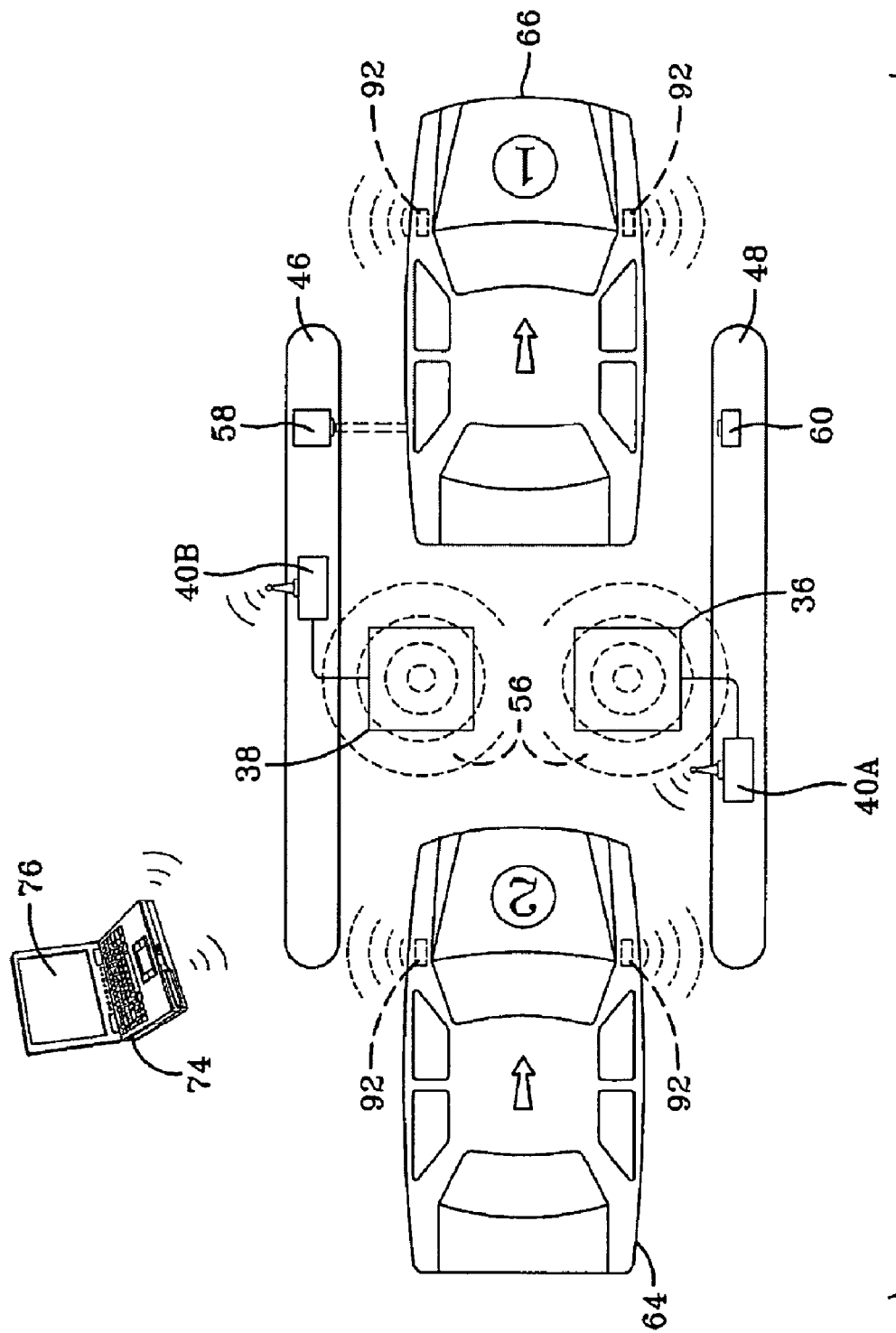
FIG. 9 is a plan view of the FIG. 10 layout.
Figure 10:
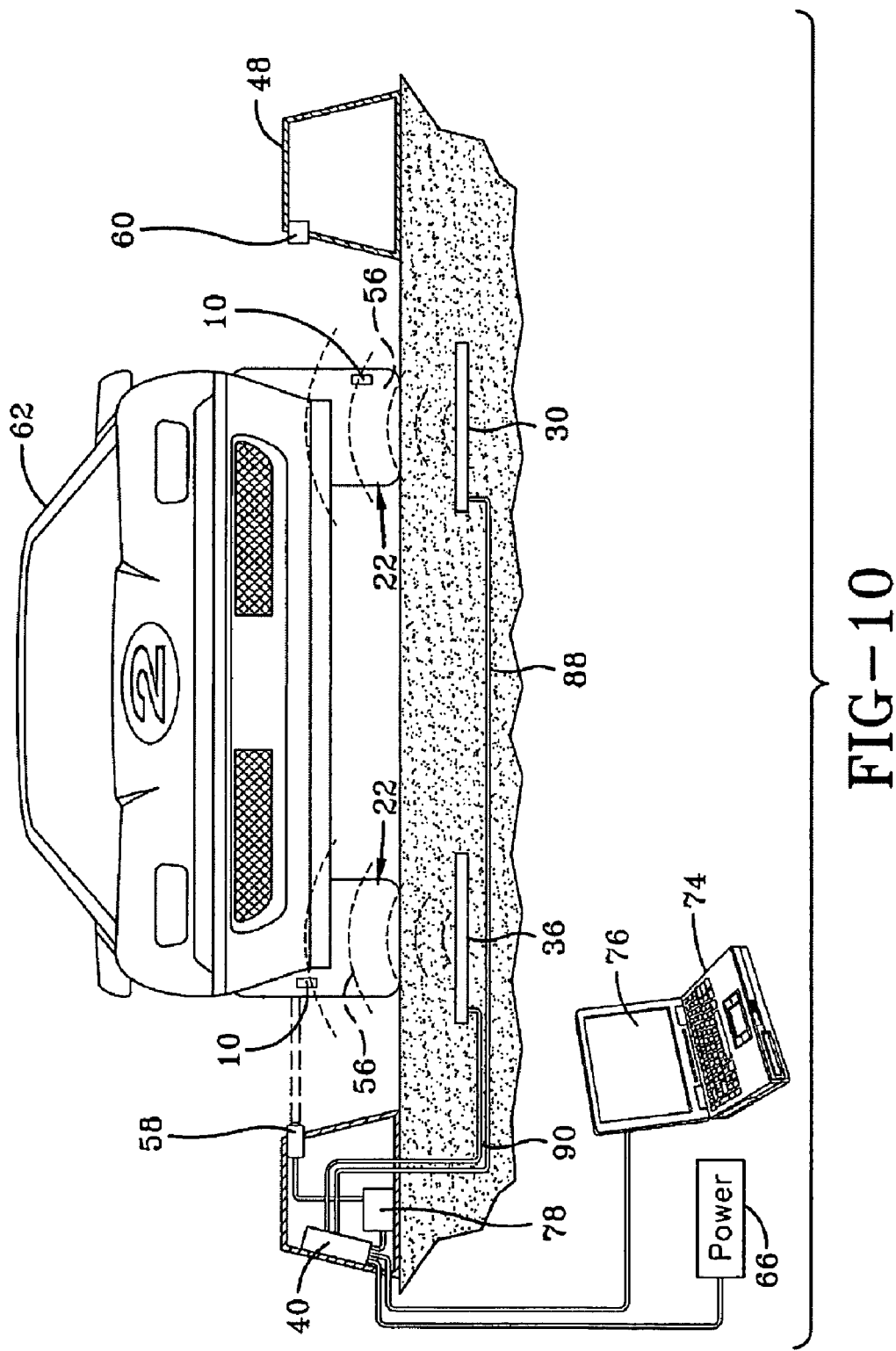
FIG. 10 is a front schematic view of a dual in ground antenna layout.

FIGS. 9 and 10 show still another alternative embodiment of the tire control system of the invention in which both antennae 36, 38 are buried beneath the pit lane surface in spaced apart relationship. The antennae 36, 38 receive data communication from respective sides of the vehicle 62 and collect the vehicle and/or tire unique serial numbers from tags 10, 92 for transmission to a common reader 40. Reader is hardwired to the computer 74 for data transmission and processing. The field 56 established by each antenna 36, 38 is directed upwardly from beneath each side of the vehicle 62 and may provide improved coupling with the tags 10, 92. However, the configuration of FIGS. 9 and 10 requires installation and therefore compromises portability, ease of use, wireless system such as FIG. 6. On the other hand, a shielded system such as that of FIG. 7 may be more robust, avoiding interference from nearby wireless networks.

The system hardware, as explained previously, is available commercially. Tire and vehicle RFID tags such as an Impinj Monza 1A integrated circuit (manufactured and sold by Hana RFID located in Twinsburg, Ohio) may be employed. An RFID reader such as a Sirit IN 510 reader (manufactured and sold by Sirit, Inc. located in Carrolton, Tex.) may be used. Reader antennas such as Poynting Patch-A0025 antennas (manufactured and sold by Poynting Antennas (Pty) Ltd. located in Wendywood, South Africa) are commercially available. A suitable light gate switch is a RightSight Photoswitch (manufactured and sold by Allen-Bradley Rockwell Automation located in Milwaukee, Wis.). Digital input and output interface may be provided such as in a Sirit interface (manufactured and sold by Sirit, Inc. located in Carrolton, Tex.) and a wireless router such as a D-Link, DIR-635 Wireless N router (D-Link Corporation located in Fountain Valley, Calif.) may be used.

An RFID reader 40 can have multiple antenna ports. In the case of the Sirit IN 510, there are four. This permits up to two antenna's per side of the portal 50 using one reader. It is preferred that data be collected more effectively with the minimum number of antennas attached to reduce the timing involved in multiplexing between antennas. The effectiveness is measured in the number of tag reads per pass. A minimum of one read per tire/vehicle per pass through the portal is needed such as in the system shown in FIG. 5. However, to ensure robustness, a minimum average of two is preferred such as that should in the FIG. 5A system. In the case of the one reader system, a maximum of one antenna per side of the portal is preferred.

From the foregoing, it will be seen that the subject invention in the embodiments described, may read both vehicle and tire tag(s) as the vehicle passes through the portal. The reading procedure permits an automatic identification of tires and full real-time visibility as the tires are leaving the pit lane without the need to stop the vehicles and without the need for manual checks. The invention thus takes no extra time and conserves allotted circuit time allocated to the race team for track testing and qualification laps. The real-time data can also be provided to fans for enhanced race enjoyment.

While shown in a race track application, the invention is not intended to be so limited. The need to track tires assigned to a particular vehicle automatically reading and unique tire and/or vehicle assigned serial numbers and then comparing read serial numbers against reference values within a database is of use in myriad applications such as commercial trucking and passenger automobile use.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire control system for a vehicle having at least one wheel unit, the wheel unit including a wheel rim and tire mounted to the wheel rim, the control system comprising:
   at least one tire-based RFID tag mounted to the tire and having a unique tire serial number stored within tag memory accessible to an external reader;
   at least one vehicle-based RFID tag mounted to the vehicle and having a unique vehicle serial number stored within vehicle tag memory accessible to an external reader;
   a pass-through portal operatively entered and exited by the vehicle;
   at least one tire-directed antenna positioned within the portal for operatively receiving at least one data transmission of the unique tire serial number from the tire-based RFID tag;
   at least one vehicle-directed antenna positioned within the portal for operatively receiving at least one data transmission of the unique vehicle serial number from the vehicle-based RFID tag;
   at least one tire-directed RFID reader coupled respectively to the tire-directed antenna and the vehicle-directed antenna for operably reading the unique tire serial number data and the unique vehicle serial number data;
   data processing means coupled to the RFID reader and having within a database a reference vehicle serial number and at least one reference tire serial number assigned to for use by a vehicle assigned the reference vehicle serial number the data processing means operably verifying a correlation identification between the unique vehicle serial number read and the stored reference vehicle serial number, comparing the unique tire serial number read with the reference tire serial number assigned to the reference vehicle serial number, and reporting anomaly discrepancies resulting from the comparison.

2. The tire control system of claim 1, wherein the one tire-directed antenna and the one vehicle-directed antenna operatively respectively receive data transmission of the unique tire serial number and the unique vehicle serial number from the tire-based RFID tag and the vehicle-based RFID tag as the vehicle is moving through the portal.

3. The tire control system of claim 2, wherein further comprising wireless transmission means for transmitting the unique tire serial number and vehicle serial number from the tire-directed reader and the vehicle-directed reader to the data processing means.

4. The tire control system of claim 3, further comprising communication means for operable external visible communication of a result of the comparisons in real time.

5. The tire control system of claim 2, wherein the tire-directed antenna and the vehicle-directed antenna are the same.

6. The tire control system of claim 5, wherein the tire-directed reader and the vehicle directed reader are the same.

7. The tire control system of claim 2, further comprising a plurality of tire-directed antennas within the portal for operatively receiving a plurality of data transmissions of the unique tire serial number from the tire-based RFID tag as the vehicle moves through the portal.

8. The tire control system of claim 7, further comprising a plurality of vehicle-directed antennas within the portal for operatively receiving a plurality of data transmissions of the unique vehicle serial number from the vehicle-based RFID tag as the vehicle moves through the portal.

9. The tire control system of claim 1, further comprising a plurality of tire-directed antennas and tire-directed readers within the portal positioned for operatively receiving a plurality of data transmissions of the unique tire serial number from the tire-based RFID tag as the vehicle moves through the portal.

10. The tire control system of claim 9, further comprising a wireless transmitter connecting the plurality of tire-directed readers to a data collection network.

11. The tire control system of claim 1, further comprising a gate mechanism for sensing movement of the vehicle within the portal, the gate mechanism being coupled to the tire-directed reader for operatively initiating at least one new data collection sequence within the portal.

12. The tire control system of claim 11, further comprising a plurality of tire-directed antennas and tire-directed readers within the portal positioned for operatively receiving a plurality of data transmissions of the unique tire serial number from the tire-based RFID tag as the vehicle moves through the portal.

13. The tire control system of claim 1, wherein the unique tire serial number is EPC based.

14. A method of tire control for a vehicle having at least one wheel unit, the wheel unit including a wheel rim and a tire mounted to the wheel rim, comprising:
 positioning the vehicle within a pass-through portal configured for vehicle entry and exit, the tire having at least one tire-based RFID tag mounted to the tire, the tire-based RFID tag having a unique tire serial number stored within tag memory accessible to an external reader;
 transmitting in a read sequence to a tire-directed reader by at least one data transmission of the unique tire serial number from the tire-based RFID tag;
 transmitting during the read sequence to a vehicle-directed reader by at least one data transmission a unique vehicle serial number from a vehicle-based RFID tag having the unique vehicle serial number stored therein;
 receiving by data processing means from the vehicle-directed reader and the tire-directed reader the unique vehicle serial number and the at least one unique tire serial number, the data processing means having within a data base a stored reference vehicle serial number and at least one reference tire serial number assigned for use by a vehicle identified by the reference vehicle serial number;
 identifying the unique vehicle serial number read as a stored reference vehicle serial number;
 comparing the unique tire serial number read with the reference tire serial number assigned to the stored reference vehicle serial number; and
 reporting detected discrepancies resulting from the comparison.

15. The method of claim 14, further comprising:
 transmitting during the read sequence the unique vehicle serial number and the unique tire serial number as the vehicle is moving through the portal.

16. The method of claim 15, further comprising:
 conducting the comparing between the unique tire serial number with the reference tire serial number as the vehicle is moving through the portal.

17. The method of claim 16, further comprising conducting the reporting of detected discrepancies as the vehicle passes through the portal.

* * * * *